United States Patent [19]

Langwell

[11] 3,934,317

[45] Jan. 27, 1976

[54] MEANS FOR DETACHABLE SUPPORT OF KEYS WITHIN A POCKET OF AN ARTICLE OF CLOTHING

[76] Inventor: John D. Langwell, 28 Branch Ave., Freeport, N.Y. 11520

[22] Filed: Sept. 24, 1973

[21] Appl. No.: 400,132

Related U.S. Application Data

[62] Division of Ser. No. 255,783, May 22, 1972, Pat. No. 3,779,053.

[52] U.S. Cl. ............................. 24/237; 24/230.5 W
[51] Int. Cl.² ................... A44B 13/00; A44B 15/00
[58] Field of Search ........ 24/230.5 W, 230.5 S, 237, 24/261 R, 261 PC, 261 G, 261 B, 261 C, DIG.10, 73 C, 73 CF; 70/458

[56] References Cited
UNITED STATES PATENTS

| | | | |
|---|---|---|---|
| 533,433 | 2/1895 | Breul | 24/237 |
| 3,105,278 | 10/1963 | Sponsel | 24/261 PC |
| 3,333,307 | 8/1967 | Wheeler | 24/261 C |

FOREIGN PATENTS OR APPLICATIONS

| | | | |
|---|---|---|---|
| 738,728 | 10/1932 | France | 24/237 |

*Primary Examiner*—Paul R. Gilliam
*Assistant Examiner*—Kenneth J. Dorner
*Attorney, Agent, or Firm*—Roberts & Cohen

[57] ABSTRACT

A key chain in which a key ring is attached to a clip adapted for detachable engagement with the material of a pocket of an article of clothing such that the ring and keys thereon are suspended within the pocket. Pivotably attached to the clip at an end thereof remote from the key ring is a manually engageable element which can be inserted into the pocket when the key chain is mounted in the worn position, the manually engageable element being removed from the pocket and employed to detach the clip from the pocket.

6 Claims, 6 Drawing Figures

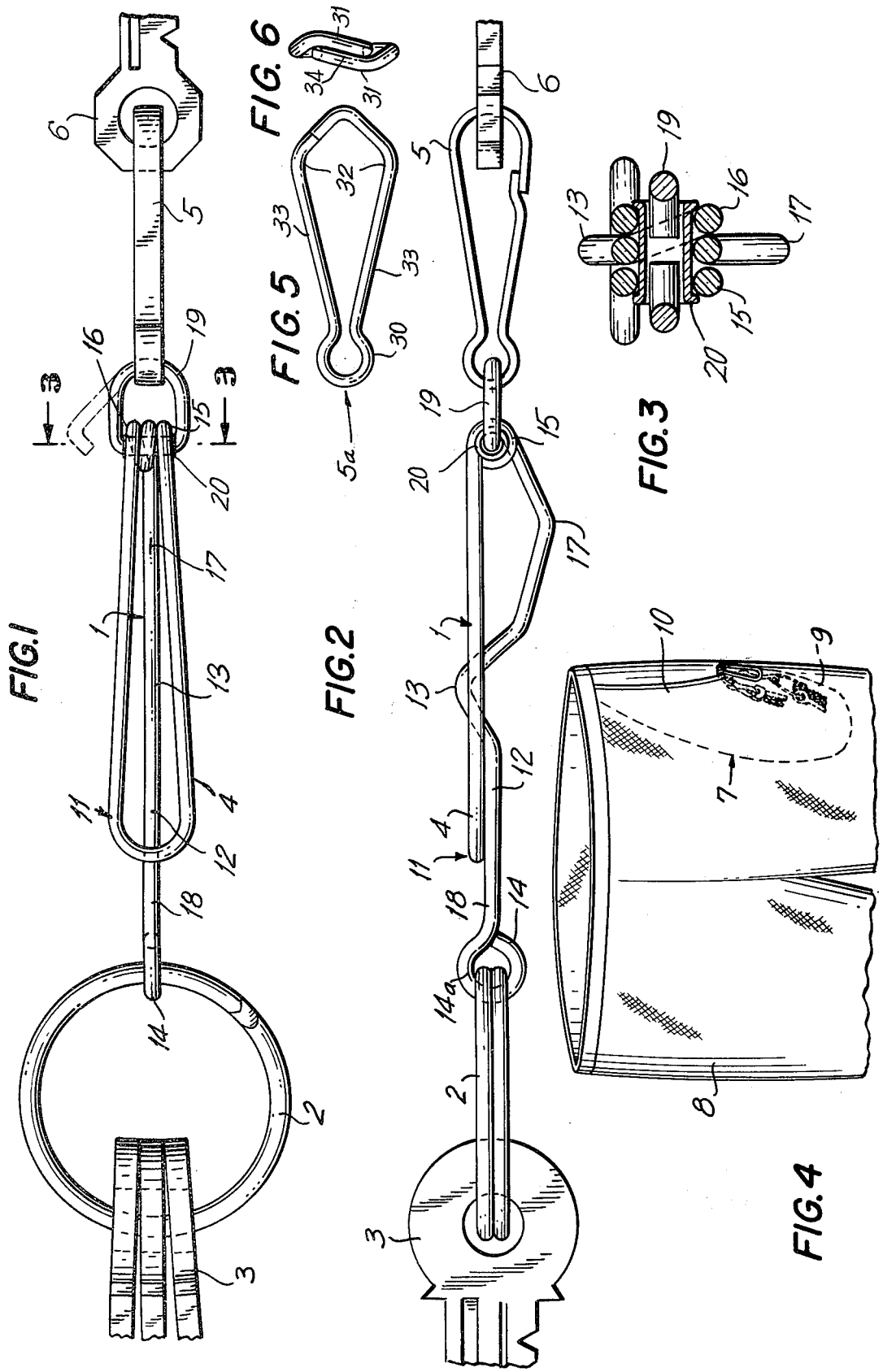

MEANS FOR DETACHABLE SUPPORT OF KEYS WITHIN A POCKET OF AN ARTICLE OF CLOTHING

CROSS RELATED APPLICATION

This application is a division of copending application Ser. No. 255,783 filed May 22, 1972 and issued as U.S. Pat. No. 3,779,053 on Dec. 18, 1973.

BACKGROUND a. Field of the Invention

The invention relates to key support apparatus and particularly to such apparatus which is adapted for being detachably supported by the material of a pocket of an article of clothing such that the keys are suspended within the pocket.

b. Prior Art

There are innumeral devices known in the art for the support of keys within the pocket of an article of clothing.

The most common device is a case which is loosely carried in the pocket and which has no physical connection to the material of the pocket. Such cases are thereby easily lost. Moreover, they are generally bulky and cumbersome and are uncomfortable to carry. Furthermore, because their weight is borne by the material of the pocket, they tend to tear the pocket and produce holes therein. The keys are generally concealed in such cases and therefore each time the keys are used or stored the case must be opened and closed.

Also known are key chain devices in which the keys are carried loosely on a ring or in a case and attached via a long chain to a clip which attaches to a belt or a trouser loop. The chain must be of sufficient length to enable the keys to be utilized in their normal operation, since the clip remains in place during use of the keys. The keys thereby never become physically separated from the person of the wearer and this minimizes loss. However, the keys are loose within the pocket despite its attachment to the chain and this results in discomfort to the wearer.

SUMMARY OF THE INVENTION

An object of the invention is to provide apparatus for detachably supporting keys within a pocket of an article of clothing which avoids the disadvantages associated with the prior art devices. The key support apparatus will hereafter be referred to by the simple generic term "key chain".

A more specific object of the invention is to provide a key chain by which the keys can be carried comfortably within a pocket and offer little likelihood of damaging the same.

The invention takes advantage of the cleft of a pocket in which to suspend the keys on a key chain. By the "cleft" of the pocket is meant the region immediately bordering the side edges of a pocket where the material is stitched together. This region is generally not utilized in carrying articles in the pocket and it has been surprisingly discovered that keys can be readily accomodated in the cleft and offer little interference to access to the pocket. Moreover, the keys are carried comfortably and their presence to the wearer is almost nil. Furthermore, the keys become relatively confined between the material of the cleft and thereby tightly retained so as not to jingle without restriction as in loosely carried keys on a ring. Additionally, because the keys are confined within the cleft in the interior of the pocket, they do not produce unsightly bulges at the front of the pocket.

In accordance with the invention, the key chain comprises a ring on which the keys are secured in detachable manner, and attached to the ring is a clip which is adapted for being detachably engaged with the material of a pocket such that the ring and keys are suspended within the cleft of the pocket.

The clip is formed with two opposed portions between which the material at the front of the pocket can be engaged. Hence, one of the opposed portions is positioned outside the pocket and this portion can be finished in decorative manner. The other portion lies within the pocket and supports the ring and keys.

In further accordance with the invention, there is attached to the clip at an end thereof remote from the ring and keys, a manually engageable member which facilitates handling of the key chain, and particularly, removal of the clip and keys from the pocket and reapplication thereto.

It is advantageous if the manually engageable member is formed as a key support means for support of separate keys such as for the house, the car etc.

The manually engageable member serves as a counterbalance means for the clip in the sense that it permits easy manual engagement and removal of the clip from the pocket.

BRIEF DESCRIPTION OF THE DRAWING

FIG. 1 is a top plan view of the key chain according to the invention;

FIG. 2 is a side elevation view of the key chain according to the invention;

FIG. 3 is a cross-sectional taken on line 3—3 in FIG. 1;

FIG. 4 shows the key chain in wearing position in the front pocket of a pair of trousers.

FIG. 5 is a top plan view of another embodiment of the snap of the key chain; and FIG. 6 is an end view of the snap of FIG. 5.

DETAILED DESCRIPTION

Referring to the drawing, FIGS. 1 and 2 show a key chain 1 which essentially comprises a ring 2 for carrying keys 3, a clip 4 connected to ring 2, and a key support member in the form of a snap 5 connected to clip 4 at an end thereof remote from the end at which ring 2 is connected to the clip. The snap 5 carries keys 6.

The key chain is intended to be detachably carried in a pocket of an article of clothing, and as seen in FIG. 4, the key chain is worn in the front jacket 7 of a pair of trousers 8.

The pockets of clothing possess clefts 9 at the side regions where the pocket material is sewed together, and it has been discovered that these clefts can be utilized for accommodating keys in suspended fashion above the bottom of the pocket and provide great convenience and comfort in the storage of keys.

In order to secure the key chain in the position in which it is worn by the user, the keys 3 on ring 2 are slid into the pocket until a ring 14 and section 18 of the clip are resting against the inside of front 10 of the pocket material, with clip 4 facing toward the outside of the pocket. Pressure is lightly applied to clip 4 to slightly open the clip and the clip is then pushed downward until the material of the front 10 of the pocket extends full depth into the clip as seen in FIG. 4. A front curved portion 14a of ring 14 prevents the clip from slipping out of position when the material of the pocket rests against section 18 during insertion.

The keys 3 on ring 2 are suspended from the clip 4 within the pocket, and are positioned in the cleft at the rear of pocket 7 in spaced relation above the bottom of the pocket. The snap 5 and keys 6 are also disposed in the same cleft at the rear of pocket 7 and overlie the ring 2 and keys 3 at a higher location in the pocket.

In such configuration, the keys are comfortably carried in the pocket and tend to be held in the cleft in the pocket by the material thereof. There is virtually no bulge produced at the front of the pocket and the key chain lies smoothly along the side of the leg of the wearer.

In order to remove the key chain from the pocket, the snap 5 and key 6 are manually grasped and removed from the pocket and these are pulled in a direction away from the pocket to slidably disengage the clip 4 from the pocket and remove the ring 2 and keys 3 therefrom.

The snap 5 and keys 6 serve as a counterbalance means in the sense that they are manually engageable to promote removal of the key chain from the pocket. Taking advantage of the elongated shape of snap 5, it is readily distinguishable by feel from ring 2 when manually engaged in the pocket, both by virtue of its different shape and its higher suspended position in the pocket from the top of the clip 4. Although the counterbalance means has been shown in the form of a snap with keys thereon, it is also possible for the counterbalance means to be a circular key ring, or to be constructed as a solid pendant without keys which, for example, can be connected by means of a chain to clip 4, and even worn outside the pocket, if desired. However, the use of snap 5 enables one to separate keys on this snap from keys on ring 2. Hence, keys which are used with greater or lesser frequency, can be separated from the rest of the keys and placed on snap 5. By way of example, house keys or car keys can be placed on snap 5.

The snap 5 is constructed of resilient material with overlapped edges serving as a quick release means, so that the keys thereon are readily removable by squeezing the snap to open a space between the edges. The ready removability of the keys on snap 5 may be of advantage if the snap carries car keys and these are to be left in the car while the remainder of the keys are to be carried by the wearer. The form of the snap 5 is immaterial and it can be made in any manner in which key removal is simple. It is significant however, that the snap 5 be freely pivotably mounted on clip 4, as the snap must be manually engageable and shifted in various directions to remove the clip 4 from the pocket.

Snap 5 is shown as smaller than ring 2 to facilitate engagement in the pocket. If it should be desired to expand the key carrying capability of snap 5, an additional ring can be added thereto.

The ring 2 has been illustrated as a conventional "splitring" but may be of any suitable construction to permit addition and removal of keys therefrom as desired.

The clip 4 is made of a single length of resilient wire bent to operative shape. The clip 4 is provided with two opposed sections 11 and 12, between which the material of the pocket is inserted, such that section 11 is outside the pocket while section 12 and ring 2 with the keys 3 thereon are suspended inside the pocket. The section 12 is formed with a bent tongue 13 which serves to hold the material in resiliently clamped relation between sections 11 and 12. The section 11 is formed as an elongated loop with opposed arms between which fits the tongue 13. At the free end of section 12, the clip is formed with a loop 14 which slidably engages the ring 2.

The clip 4 is formed by bending loop 14 at one end of a length of wire and a loop 15 at the other end of the wire. A coil 16 of two turns is then wound at an intermediate location in the wire and a bend 17, tongue 13 and straight section 18 are formed in succession. Thereafter the elongated loop 11 is formed by bending the wire so that loop 15 is brought into a coaxial position with coil 16.

A loop connector 19 extends through loop 15 and coil 16 and is freely pivotable therein and the snap 5 is connected to the loop connector 19. Optionally, if desired, a small chain of links or the like may be interposed between snap 5 and connector 19.

An eyelet 20 can be advantageously fixedly inserted in loop 15 and the coaxial coil 16 and receive loop connector 19.

The connector 19 is initially in the form of a spread open U, with divergent legs provided with inwardly bent ends at 90 degrees facing each other. The connector 19 is secured in the eyelet by deforming the legs into eyelet 20 where they are brought together in permanently clamped relation in the eyelet in the manner diagrammatically illustrated in FIG. 1.

It is important to note, that the spring pressure of the clip 4 can be increased or decreased at the bend 17, by bending the resilient wire in the proper direction. An increase of pressure, which would also increase the holding power of the clip might be advantageous, if the wearer would be involved in extra heavy physical activities. In addition, the tongue 13 can be bent to protrude deeper into the elongated loop 11, which will even further increase the holding capacity of the clip and be an added protection against loss. Under normal conditions however, both changes, which can easily be accomplished either by the user or at the time of manufacture, are superfluous.

FIG. 5 shows another embodiment of the snap designated by numeral 5a. The snap 5a is preferred over the simple resilient band snap 5, in that snap 5a is bent to shape from a single length of the same wire from which the clip 4 is made.

The snap 5a is of generally elongated form with a loop 30 at one end for engaging connector 19, and at the other end, the snap 5a has overlapped edge portions 31 which are of V-shape in plan view and contitute the quick release means for removable attachment of keys or a key ring. The snap 5a is formed with opposed V-shapted shoulders 32. As seen in FIG. 6, the overlapped edge portions are of V-shape and converge towards respective apexes in opposite directions so as to mate along a surface 34 which is inclined with respect to the plane of the clip. In order to open snap 5a to remove either keys or a key ring therefrom, the shoulders 32 are engaged by a key or the ring and the latter is twisted to move the shoulders away from one another in a direction to cause the edge portions 31 to become spaced apart and permit removal of the keys or ring. To replace the keys or ring on snap 5a, the keys or ring are forceably inserted between the overlapped edge portions 31 to cause the same to resiliently yield and permit placement of the keys or ring on the snap whereafter the edge portions resiliently return to their original overlapped positions. To facilitate entry of the keys and ring between the overlapped edge portions 31, the user can apply lateral pressure to the opposite legs 33 of the snap to cause the shoulders 32 to move transversely towards one another, this producing opening of the space between the edge portions 31.

In the course of use of the key chain, the snap 5a greatly resists longitudinal forces applied to the snap at the apex of the V due to the provision of the overlapped edges. The snap 5 constructed of a resilient band, is somewhat less effective in this respect since longitudinal forces applied to the band tend to deform the same and open the closure.

Although the invention has been described with reference to an exemplary embodiment thereof, numerous variations and modifications will become evident to those skilled in the art without departing from the scope and spirit of the invention as defined in the appended claims.

What is claimed is:

1. A releasable connector comprising a length of resilient material bent to provide a closed loop at one end and a pair of branches with overlapped edge portions at an opposite end to form a closed link, said branches lying substantially in a common plane and including V-shaped shoulders in opposition to one another in said plane, said V-shaped shoulders having apexes facing away from one another, said overlapped edge portions being of V-shape when viewed in a direction perpendicular to said common plane, and being in superposed registry with one another, said V-shape edge portions having respective apexes and legs converging towards said apexes in a direction away from said closed loop, said apexes of the edge portions being disposed along a line substantially midway between said V-shaped shoulders, said overlapped portions also being bent out of said plane, said overlapped portions being of V-shape when viewed in end elevation in a direction parallel to said plane, said overlapped portions converging towards respective apexes in opposite directions so as to mate along a surface which is inclined with respect to said plane, said V-shaped shoulders of said branches being movable relative to one another to open the overlapped edge portions of the link and enable removal of articles from the link.

2. A connector as claimed in claim 1 wherein said resilient material comprises a wire.

3. A connector as claimed in claim 1 wherein said apexes of the V-shaped shoulders are symmetrically aligned with one another in said link.

4. A connector as claimed in claim 3 wherein said V-shaped shoulders are twisted to open the overlapped edge portions of the link.

5. A connector as claimed in claim 1 wherein said overlapped edge portions have terminal ends disposed adjacent said V-shaped shoulders.

6. A connector as claimed in claim 1 wherein said branches diverge along straight lines from said closed loop to said V-shaped shoulders.

\* \* \* \* \*